(12) United States Patent
Barkelew et al.

(10) Patent No.: US 8,793,364 B1
(45) Date of Patent: Jul. 29, 2014

(54) REMOTE POWER CONTROLLER

(75) Inventors: Jonathan Bret Barkelew, Atlanta, GA (US); Daniel Clifton Service, Decatur, GA (US)

(73) Assignee: American Megatrends, Inc., Norcross, GA (US)

( * ) Notice: Subject to any disclaimer, the term of this patent is extended or adjusted under 35 U.S.C. 154(b) by 980 days.

(21) Appl. No.: 12/325,743

(22) Filed: Dec. 1, 2008

(51) Int. Cl.
*G06F 15/173* (2006.01)
*G06F 9/00* (2006.01)

(52) U.S. Cl.
USPC ............................................. 709/224; 713/2

(58) Field of Classification Search
USPC ................................ 709/224, 217–219; 713/2
See application file for complete search history.

(56) References Cited

U.S. PATENT DOCUMENTS

| | | | |
|---|---|---|---|
| 6,151,653 A * | 11/2000 | Lin et al. ........................ | 710/305 |
| 7,233,336 B2 | 6/2007 | Mondal | |
| 2003/0023843 A1 * | 1/2003 | Heath et al. ........................ | 713/2 |
| 2005/0257041 A1 * | 11/2005 | Wallenstein et al. .............. | 713/2 |
| 2007/0027981 A1 * | 2/2007 | Coglitore et al. .............. | 709/224 |
| 2007/0055740 A1 * | 3/2007 | Luciani et al. ................. | 709/217 |
| 2009/0323974 A1 * | 12/2009 | Chang et al. ..................... | 381/59 |

* cited by examiner

*Primary Examiner* — Chirag R Patel
(74) *Attorney, Agent, or Firm* — Morris Manning & Martin, LLP; Tim Tingkang Xia, Esq.

(57) ABSTRACT

A remote power controller apparatus includes a first interface for communicating with a host computer, a second interface for communicating with a target computer, and a processing component configured to receive a request on the first interface to change the power state or to reset the target computer. In response to receiving such a request, the processing component is configured to transmit a signal on the second interface for changing the power state of the target computer or for resetting the target computer. The processing component may also be configured to receive a signal on the second interface indicating the power state of the target computer, the state of a mass storage device of the target computer, or the state of an audio device of the target computer, and to transmit data indicating the state to the host computer on the first interface.

31 Claims, 6 Drawing Sheets

REMOTE POWER CONTROLLER

BACKGROUND

When debugging the hardware or software of a personal computer system, it is frequently necessary to toggle the power of the computer being debugged (the "target" computer). As a part of the debugging process, it may also be necessary to reset the target computer, to observe the status of a mass storage device connected to the target computer, and to observe the status of another device integral with or connected to the target computer.

Hardware buttons are typically available for powering a computer on or off and for resetting the computer. Visual indicators, such as light-emitting diodes ("LEDs"), are also typically available for providing a visual indication of the power state of the target computer and the state of mass storage devices within the target computer. An audible indicator, such as a speaker, may also provide an audible indication of the state of the computer system. However, the technician performing the debugging of the target computer must be located at the same physical location as the target computer in order to utilize the power and reset buttons and to observe the visual or audible indicators provided by the target computer.

Software exists that allows a technician to remotely control the operation of a target computer, such as toggling the power of the target computer and resetting the target computer. Such software, however, typically requires that the target computer be executing an operating system in order to function. As a result, if the target computer malfunctions prior to the execution of an operating system, such as during a Power-on Self Test ("POST"), it may not be possible to use such software to reset the target computer, to view the power state of the target computer, or to view the state of mass storage devices connected to the target computer.

Hardware devices also exist that allow a technician to remotely toggle the power of a target computer. However, these hardware devices must be physically inserted into an expansion slot of the target computer, such as a peripheral component interconnect ("PCI") local bus slot. Unfortunately, the use of an expansion slot in this manner may not be possible or may be otherwise impracticable.

It is with respect to these considerations and others that the disclosure made herein is presented.

SUMMARY

Technologies are described herein for remotely controlling and monitoring the operation of a computer system. Through the utilization of the technologies and concepts presented herein, a user remotely located from the physical location of a target computer can toggle the power of the target computer, reset the target computer, and observe the power state, mass storage device state, and the state of an audio device within the target computer. This functionality may be provided without using a physical expansion slot within the target computer.

According to one aspect presented herein, an apparatus is provided for controlling and monitoring the operation of a target computer. In one implementation, the apparatus includes a first interface for communicating with a host computer and a second interface for communicating with the target computer. The apparatus also includes a processing component, such as a microcontroller, configured to receive a request by way of the first interface to change the power state of the target computer. For instance, the processing component may receive a request to turn the target computer on or off. In response to receiving such a request on the first interface, the processing component is configured to transmit a signal on the second interface for changing the power state of the target computer.

According to other aspects, the processing component may be configured to receive a request by way of the first interface to reset the target computer. In response to receiving such a request, the processing component is further configured to transmit a signal on the second interface for resetting the target computer. The processing component may also be configured to receive a signal by way of the second interface indicating the power state of the target computer, the state of a mass storage device of the target computer, or the state of an audio device of the target computer, and to transmit data to the host computer by way of the first interface indicating the state.

A computer program is provided in embodiments for execution on the host computer that can be utilized by a user to provide requests to the apparatus to toggle the power state of the target computer and to reset the target computer. The computer program is also configured to provide a user interface including visual indicators showing the power state of the target computer, the state of a mass storage device of the target computer, and the state of an audio device of the target computer.

In embodiments, the first interface comprises a wired universal serial bus ("USB") interface provided by a USB-to-universal asynchronous receiver/transmitter ("UART") interface. It should be appreciated, however, that other types of external wired or wireless interfaces might be utilized for communicating with the host computer. According to other embodiments, the second interface comprises one or more general purpose input/output ("GPIO") connections provided by the microcontroller and configured for providing signals to, and reading signals from, header pins on a motherboard of the target computer. Other types of interfaces may also be utilized to implement the second interface for communicating with the host computer.

It should be appreciated that aspects of the above-described subject matter may also be implemented as a system, computer-controlled apparatus, a computer process, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for remotely controlling and monitoring the operation of a computer system. In the following detailed description, references are made to the accompanying drawings that form a part hereof, and which are shown by way of illustration specific embodiments or examples. Referring now to the drawings, in which like numerals represent like elements through the several figures, aspects of a system 100 for remotely monitoring and controlling the operation of a target computer 106 will be presented.

Figure 1:
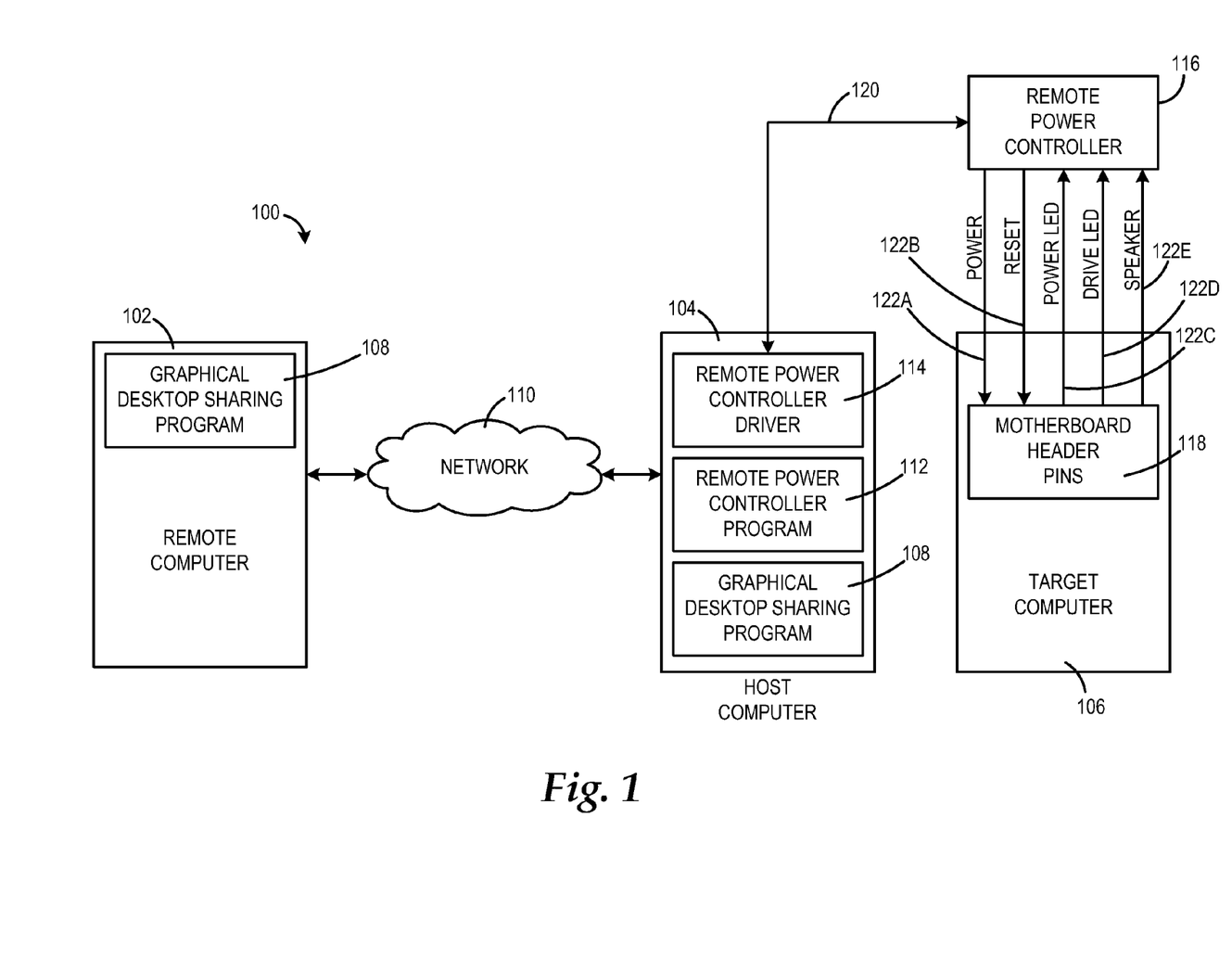
FIG. 1 is a network, hardware, and software architecture diagram illustrating aspects of an operating environment for the embodiments presented herein along with aspects of several hardware and software components presented herein.

As shown in FIG. 1, the system 100 includes a remote computer 102, a host computer 104, and a target computer 106. The remote computer 102, host computer 104, and target computer 106 comprise standard desktop, laptop, or mobile computing systems configured with at least the hardware and software components presented herein. It should be appreciated that the remote computer 102, host computer 104, and target computer 106 may include other software and hardware components not described herein, may perform other functionality not described herein, and may comprise other types of handheld, embedded, or specific-purpose computing systems.

As illustrated in FIG. 1, the remote computer 102 and the host computer 104 are configured to communicate with one another via a network 110. The network 110 may comprise any type of local area or wide area network, such as the Internet. The remote computer 102 and the host computer 104 are also configured to execute a graphical desktop sharing program 108. The graphical desktop sharing program 108 allows a user of the remote computer 102 to view screen displays provided by the host computer 104.

The graphical desktop sharing program 108 also allows a user of the remote computer 102 to control the operation of the host computer 104 as if the user of the remote computer 102 was physically present at the host computer 104. For instance, a user of the remote computer 102 may provide keyboard or mouse input at the remote computer 102. The graphical desktop sharing program 108 transmits the user input to the host computer 104 where the graphical desktop sharing program 108 executing thereupon presents the user input to the host computer 104 as if it was provided locally. In this manner, a user of the remote computer 102 can control virtually every aspect of the host computer 104. In one embodiment, the graphical desktop sharing program 108 comprises the virtual network computing ("VNC") graphical desktop sharing system. It should be appreciated, however, that other types of graphical desktop sharing programs may be utilized in other embodiments.

As also shown in FIG. 1, the system 100 includes a remote power controller 116. As will be described in greater detail herein, the remote power controller 116 includes a first interface 120 for communicating with the host computer 104. A remote power controller driver 114 executes on the host computer 104 for assisting the host computer 104 with communicating with the remote power controller 116. A remote power controller program 112 also executes on the host computer 104 for enabling a local user of the host computer 102 to control the remote power controller 116 and to view various aspects of the operation of the target computer 106. Additional details regarding the operation of the remote power controller program 112 will be provided below.

According to embodiments, the remote power controller 116 also includes a second communications interface for communicating with the target computer 106. Through the second interface, connections are made to one or more motherboard header pins 118 that are present on a motherboard of the target computer 106. As known in the art, motherboard header pins 118 are commonly provided on system motherboards for connection to hardware switches and visual indicators mounted on a case of the target computer 106. For instance, motherboard header pins 118 may be provided by the target computer 106 for toggling the power of the target computer 106 and for resetting the target computer 106. Additionally, other motherboard header pins 118 may be provided for driving a power LED, a mass storage activity LED, or a speaker. Other types of motherboard header pins 118 may be present within the target computer 106 and utilized in a similar manner as described herein.

In one implementation, the remote power controller 116 is configured with connections 112A and 112B for connection to the power and reset motherboard header pins 118 of the target computer 106. Additionally, the remote power controller 116 may be configured with connections 122C-122E for connection to motherboard header pins 118 corresponding to a power LED, a drive activity LED, and a speaker, respectively.

As will be described in greater detail below, the remote power controller 116 includes a processing component that is configured to communicate with the host computer 104 through the interface 120 and configured to communicate with the target computer 106 through the connections 122A-122E. In particular, the remote power controller 116 is configured to communicate with the remote power controller program 112 executing at the host computer 104. Through a user interface provided by the remote power controller program 112, a user of the host computer 104 or a user of the remote computer 102 can cause a signal to be transmitted from the host computer 104 to the remote power controller 116 for toggling the power of the target computer 106 and for resetting the target computer 106. In response to receipt of such a signal, the remote power controller 116 is configured to apply an appropriate signal to the connections 122A-122B, respectively, which, in turn, will cause the target computer to toggle power or to reset itself.

According to other aspects, the processing component within the remote power controller 116 is also configured to receive signals on the connections 122C-122E and to relay these signals to the remote power controller program 112 via the interface 120. In response thereto, the remote power controller program 112 is configured to provide a visual indication regarding the power status, mass storage activity, and speaker activity of the target computer 106. This information can be viewed by a user local to the host computer 104 or by a user of the remote computer 102 utilizing the graphical desktop sharing program 108. Additional details regarding the operation of the remote power controller program 112 and the remote power controller 116 will be provided below with respect to FIGS. 2-6.

Figure 2:
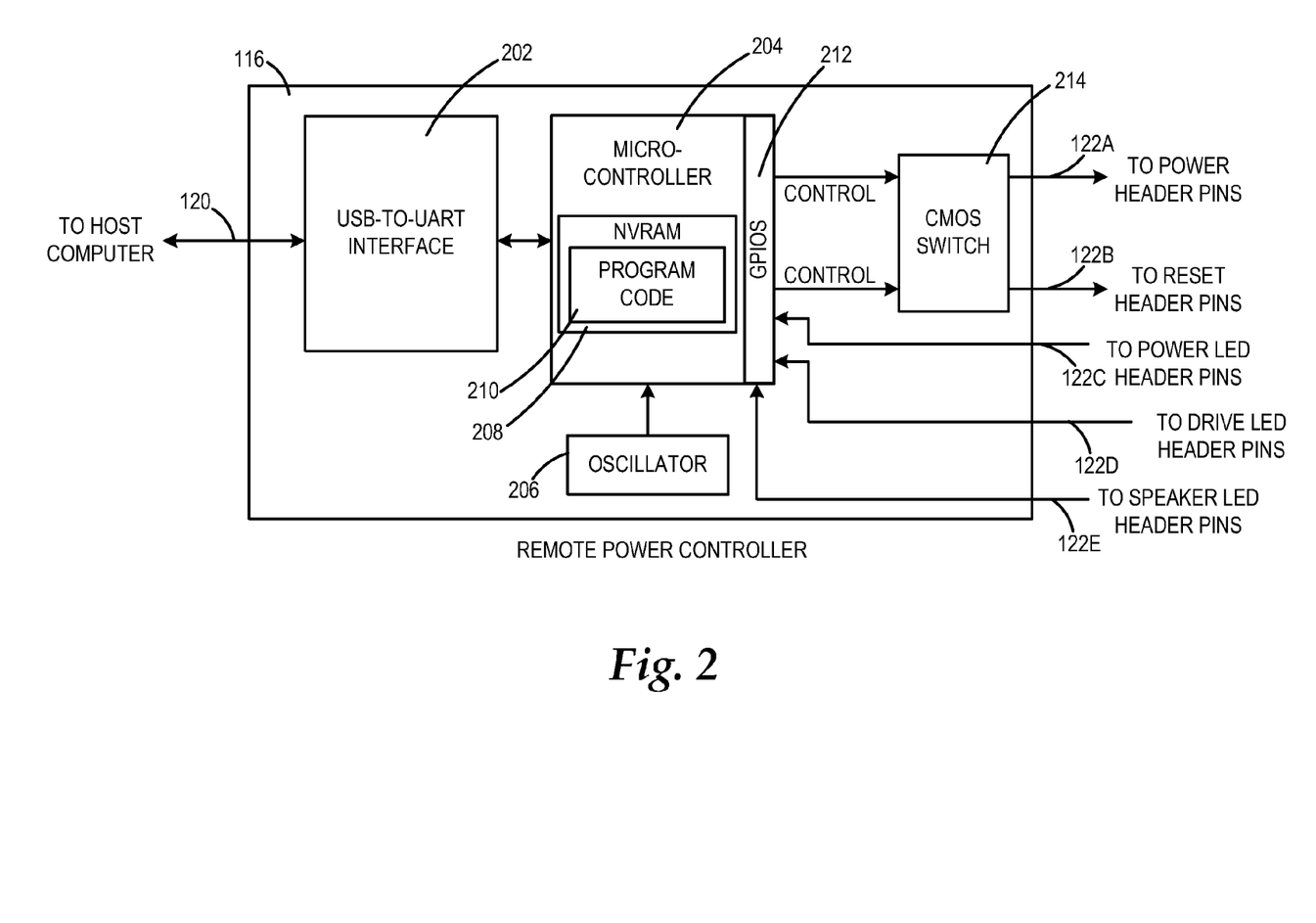
FIG. 2 is a hardware architecture diagram showing an illustrative hardware architecture for a remote power controller provided in one embodiment presented herein.

Referring now to FIG. 2, a hardware architecture diagram showing an illustrative hardware architecture for the remote power controller 116 in one embodiment will be described. As discussed briefly above with respect to FIG. 1, the remote power controller 116 includes a processing component configured to control its operation. According to one implementation, the processing component comprises a microcontroller 204. As known in the art, a microcontroller is a functional computer system on a chip. Typically, a microcontroller contains a processor core, memory, and programmable input/output peripherals. Generally, microcontrollers emphasize high integration, in contrast to microprocessors which only contain a central processing unit. In the embodiment presented herein, the microcontroller 204 includes a nonvolatile random access memory ("NVRAM") 208 that stores program code 210 executable by a processor core with the microcontroller 204 to provide the functionality presented herein. The microcontroller 204 also includes several general purpose input/outputs 212 that are utilized in the manner described below. An oscillator 206 may provide necessary clock signals for the operation of the microcontroller 204. Additionally, power circuitry not shown in FIG. 2 may be provided to supply appropriate power and ground signals to the microcontroller 204.

According to one implementation, the microcontroller 204 comprises an ATMEGA 168 microcontroller from the ATMEL CORPORATION. The ATMEGA 168 is an 8-bit microcontroller that includes 8 kilobytes of in-system programmable flash memory. The ATMEGA 168 also includes an advanced reduced instruction set computer ("RISC") architecture and 23 programmable input/output lines. It should be appreciated that while the ATMEGA 168 is utilized in one embodiment, other microcontrollers from other manufacturers may also be utilized. It should be further appreciated that although a microcontroller has been described herein as the processing component utilized to control the operation of the remote power controller 116, a general purpose central processing unit with external memory, a custom integrated circuit, a field programmable gate array ("FPGA"), or other types of processing components may be utilized to provide the functionality presented herein.

As also described briefly above with respect to FIG. 1, the remote power controller 116 includes a communications interface for communicating with the host computer 104. In one implementation, this interface comprises a USB-to-UART interface 202. As illustrated in FIG. 2, the USB-to-UART interface 202 provides a UART connection to the microcontroller 204 and a USB connection to the host computer 104. The USB-to-UART interface 202 includes appropriate circuitry for converting the USB signals received from the host computer 104 to a UART format compatible with the microcontroller 204.

According to one implementation, the USB-to-UART interface 202 comprises the FT 232R USB UART integrated circuit from FUTURE TECHNOLOGIES DEVICES INTERNATIONAL, LIMITED. The FT 232R is a USB-to-serial UART interface that handles the entire USB protocol on a single chip. The FT 232R also includes fully integrated USB termination resistors, fully integrated clock generation, data transfer rates from 300 baud to 3M baud, and a virtual communication port driver for execution on the host computer 104. The remote power controller driver 114 shown in FIG. 1 is provided in order to communicate with the USB-to-UART 202.

It should be appreciated that while the USB-to-UART interface 202 is described in one embodiment as comprising the FT 232R USB UART, other types of USB-to-UART integrated circuits from other manufacturers may also be provided. It should also be appreciated that while the communications interface for communicating with the host computer 104 is described herein as being a USB-to-UART interface in one embodiment, other types of communications interfaces implemented in other manners may also be utilized. For instance, a standard USB interface may be utilized to communicate with the host computer 104. Similarly, other types of wired, or wireless, interfaces may be utilized to enable data communication with the host computer 104.

As also illustrated in FIG. 2, the remote power controller 116 is configured for connection to the motherboard header pins 118 of the target computer 106. In particular, as shown in FIG. 2, a connection 122C is provided between the GPIOs 212 and the motherboard header pins 118 that indicate the power status of the target computer 106. By reading the signals available via the connection 122C, the microcontroller 204 can determine whether the target computer 106 is powered on or off. According to another embodiment, a connection 122D is made between the GPIOs 212 and the motherboard header pins 118 that indicate the status of a mass storage device within the target computer 106. Typically, these header pins are connected to an LED or other type of visual indicator connected to the target computer 106. By reading the signal on the connection 122D, the microcontroller 204 can determine whether the mass storage device is active or idle. According to another implementation, a connection 122E is provided between the GPIOs 212 and the motherboard header pins 118 typically connected to a speaker within the target computer 106. By reading the signal on the connection 122E, the microcontroller 204 can determine whether the target computer 106 is outputting an audio signal intended for playback on a speaker.

According to one implementation, a connection 122A is provided between the GPIOs 212 and the motherboard header pins 118 for toggling the power status of the target computer 106. Typically these header pins are connected to a switch available external to the target computer 106 through which a user of the target computer 106 may toggle the power. Through the connection 122A and the use of a CMOS switch 214, the power of the target computer 106 may be toggled under control of the microcontroller 204. Similarly, a connection 122B is provided to the motherboard header pins 118 for resetting the operation of the target computer 106. Typically, these header pins are connected to a switch external to the target computer 106 for resetting the operation of the target computer 106. Through this connection and the use of CMOS switch 214, the operation of the target computer 106 may be reset under control of the microcontroller 204. It should be appreciated that other connections may be made between the microcontroller 204 and other motherboard header pins 118 for providing additional functionality not described herein.

Figure 3:
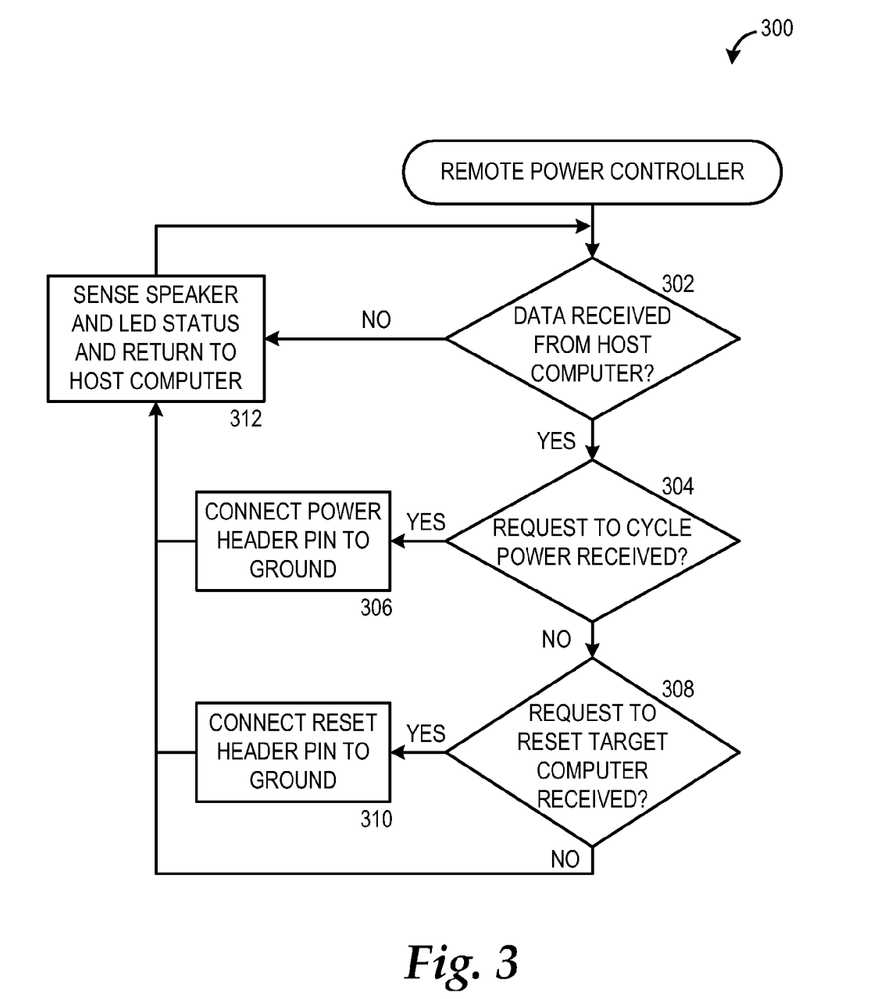
FIG. 3 is a flow diagram illustrating aspects of the operation of a remote power controller provided in one embodiment presented herein.

Turning now to FIG. 3, additional details will be provided regarding the embodiments presented herein for remotely controlling and monitoring the target computer 106. In particular, FIG. 3 is a flow diagram showing a routine 300 that illustrates aspects of the operation of the program code 210 executing on the microcontroller 204 in one embodiment presented herein.

It should be appreciated that the logical operations described herein with respect to FIG. 3 and elsewhere are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins its operation at operation 302, where the microcontroller 204 determines whether data was received from the host computer 104 via the first communications interface. As mentioned above, in one implementation, the first communications interface comprises the USB-to-UART interface 202. If it is determined that data has not been received on the first communications interface, the routine 300 proceeds from operation 302 to operation 312, described below. If, however, the microcontroller 204 determines that data was received from the host computer 104 on the first communications interface, the routine 300 proceeds from operation 302 to operation 304.

At operation 304, the microcontroller 204 determines whether the data received on the first communications interface comprises a request to toggle the power of the target computer 106. If such a request is received, the routine 300 proceeds from operation 304 to operation 306, where the microcontroller 204 causes the connection 122 to be briefly grounded via use of the CMOS switch 214. Through the grounding of the connection 122A, the appropriate motherboard header pins 118 for toggling the power of the target computer 106 are also connected to ground, thereby causing the target computer 106 to be powered off if it is in the power on state, and to be powered on if it is in the power off state. From operation 306, the routine 300 proceeds to operation 312, described below.

If, at operation 304, the microcontroller 204 determines that a request to toggle the power of the target computer 106 has not been received on the first communications interface, the routine 300 proceeds from operation 304 to operation 308. At operation 308, the microcontroller 204 determines whether a request has been received on the first communications interface to reset the target computer 106. If such a request has been received, the routine 300 proceeds from operation 308 to operation 310 where the microcontroller 204 causes the connection 122B to be briefly grounded through the use of the CMOS switch 214. In this manner, the motherboard header pins 118 for resetting the target computer are briefly connected to ground. In response to such a connection, the operation of the target computer 106 is reset. From operation 310, the routine 300 proceeds to operation 312 described below. If, at operation 308, the microcontroller 204 determines that a request to reset the target computer 106 was not received on the first communications interface, the routine 300 proceeds from operation 308 to operation 312.

At operation 312, the microcontroller 204 utilizes the GPIOs 212 to sense the signals on the connections 122C, 122D and 122E. As discussed above, these signals provide an indication as to whether the target computer 106 is powered on, whether a mass storage device connected to the target computer 106 is active, and whether the target computer 106 is outputting audio intended for a speaker, respectively. Once the status of the connections 122C-122E has been determined, the microcontroller 204 transmits data to the host computer 104 via the first communications interface indicating the status of these connections. As will be described in greater detail below, the remote power controller program 112 executing on the host computer 104 is configured to receive this data and to provide a visual indication of the power status, mass storage device status, and speaker status of the target computer 106 to a user of the host computer 104 or a user of the remote computer 102. From operation 312, the routine 300 returns to operation 302, where the above described processes are repeated.

Figure 4:
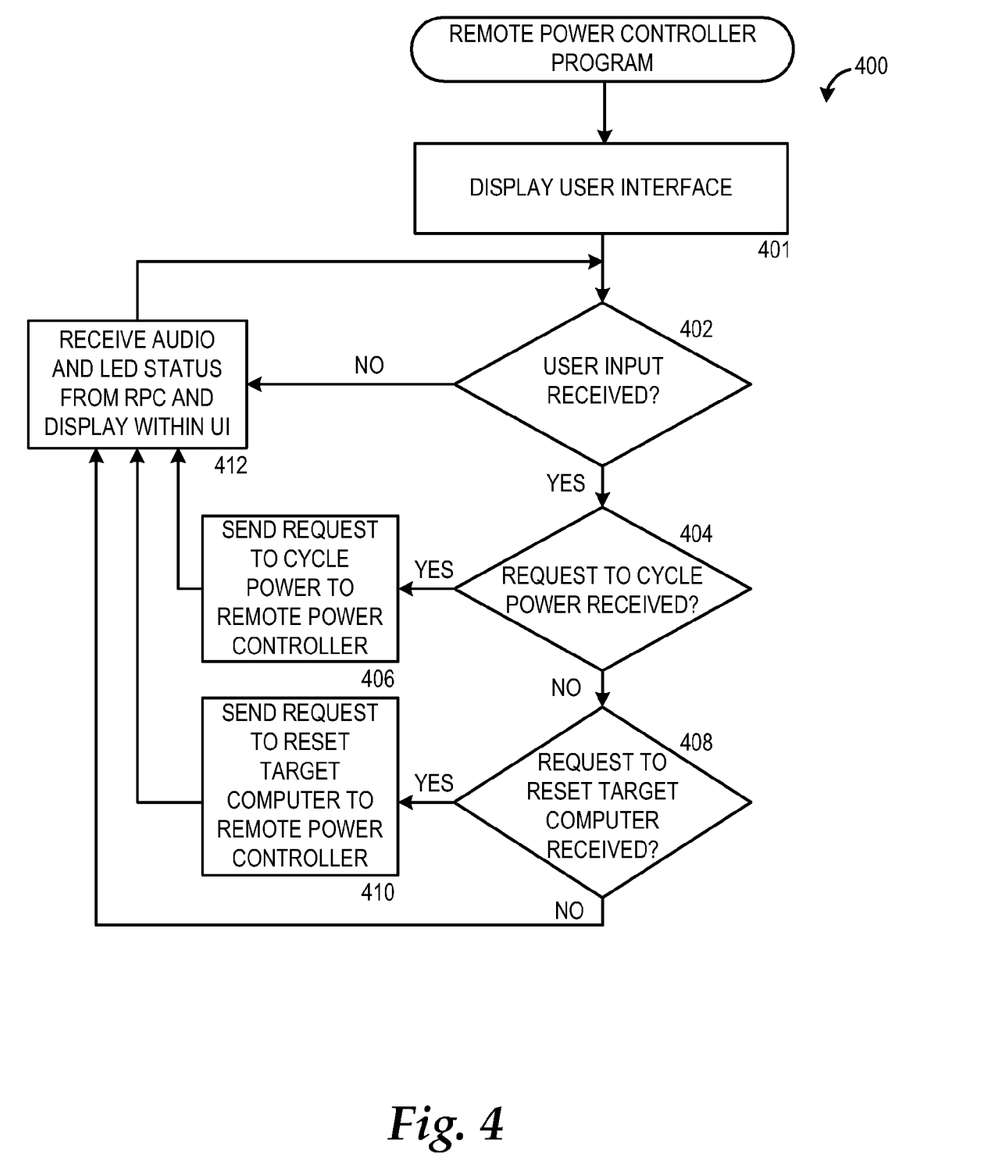
FIG. 4 is a flow diagram showing aspects of the operation of a remote power controller program for controlling the operation of the remote power controller provided in embodiments presented herein.

Referring now to FIG. 4, an illustrative routine 400 will be described illustrating the operation of the remote power controller program 112 in one embodiment presented herein. As discussed briefly above, the remote power controller program 112 executes on the host computer 104 and provides a user interface for controlling the operation of the target computer 106 and for monitoring the status of the target computer 106. In order to perform this functionality, the remote power controller program 112 utilizes the remote power controller driver 114 to communicate with the remote controller 116.

Through the remote power controller driver 114, the remote power controller program 112 can transmit commands to the remote power controller 116 for toggling the power of the target computer 106 or resetting the target computer 106. Similarly, through the remote power controller driver 114, the remote power controller program 112 can receive data from the remote power controller 116 indicating the power status of the target computer 106, the status of one or more mass storage devices connected to the target computer 106, and the status of a speaker output of the target computer 106. The routine 400 illustrates the operations performed by the remote power controller program 112 to provide this functionality.

The routine 400 begins at operation 401, where the remote power controller program 112 provides a user interface that allows a user of the host computer 104 to provide commands and to view the status of the target computer 106. An illustrative user interface 500 for providing this functionality will be described below with respect to FIG. 5. As also described briefly above, a user of the remote computer 102 utilizing the graphical desktop sharing program 108 can utilize the remote power controller program 112 from the remote location.

From operation 401, the routine 400 proceeds to operation 402, where the remote power controller program 112 determines whether user input has been received via the user interface 500. If no user input has been received, the routine 400 proceeds from operation 402 to operation 412, which will be described in detail below. If user input is detected at operation 402, the routine 400 proceeds to operation 404 where the remote power controller program 112 determines whether a user has requested to toggle the power of the target computer 106. If such a request has been received via the user interface 500, the routine 400 proceeds from operation 404 to operation 406. At operation 406, the remote power controller program 112, transmits data to remote power controller 116 via the driver 114 requesting that the power of the target computer 106 be toggled. The routine 400 then proceeds from operation 406 to operation 412, described below.

If, at operation 404, the remote power controller program 112 determines that a request to toggle the power of the target computer 106 has not been received, the routine 400 proceeds from operation 404 to operation 408. At operation 408, the remote power controller program 112 determines whether a request to reset the target computer was received via the user interface 500. If such a request was received, the routine 400 proceeds from operation 408 to operation 410, where the remote power controller program 112 transmits data to the remote power controller 116 requesting that the operation of the target computer 106 be reset. From operation 410, the routine 400 proceeds to operation 412. If, at operation 408, the remote power controller program 112 determines that a request to reset the target computer 106 has not been received, the routine 400 proceeds from operation 408 to operation 412.

At operation 412, the remote power controller program 112 receives data from the remote power controller 116 via the interface 120 indicating the power status of the target computer 106, the status of one or more mass storage devices connected to the target computer 106, and the status of a speaker of the target computer 106. As discussed above with respect to FIG. 3, the remote power controller 116 determines the status of these devices from signals present on the motherboard header pins 118. When the remote power controller program 112 receives this data from the remote power controller 116, it updates the user interface 500 to provide a visual indication of the power status of the target computer 106, the status of a mass storage device connected to the target computer 106, and the status of a speaker output of the target computer 106. From operation 412, the routine 400 proceeds to operation 402, where the above described process is repeated.

Figure 5:
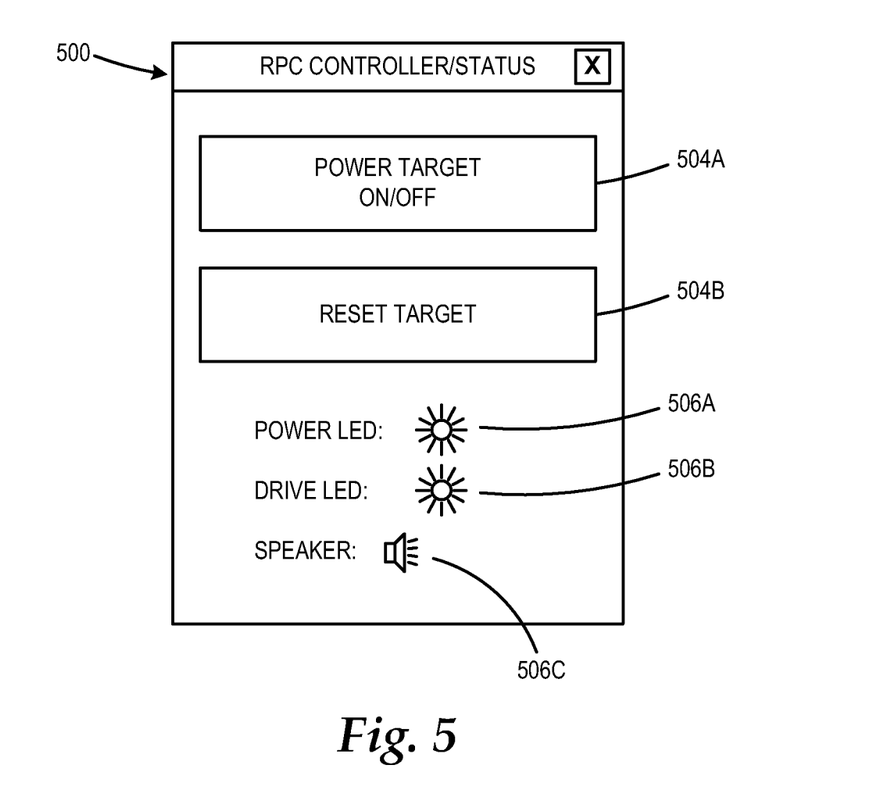
FIG. 5 is a user interface diagram showing one illustrative user interface provided by a remote power controller program provided herein for interacting with a remote power controller in one embodiment.

Referring now to FIG. 5, a user interface diagram showing one illustrative user interface 500 provided by the remote power controller program 112 for interacting with the remote power controller 116 will be described. As shown in FIG. 5, the user interface 500 includes several user interface controls through which a user of the host computer 104 may provide requests to toggle the power of the target computer 106 or to reset the target computer 106. In particular, a selectable user interface control 504A is provided which, when selected by a user of the host computer 104 utilizing an appropriate user input device will cause the remote power controller program 112 to transmit a signal to the remote power controller 116 to toggle the power state of the target computer 106 in the manner described above. A selectable user interface control 504B is also provided which, when selected by a user of the host computer 104, will cause the remote power controller program 112 to transmit a request to the remote power controller 116 to reset the target computer 106 in the manner described above.

According to one implementation, the user interface 500 also includes several visual indicators 506A-506C that are utilized to display the power status of the target computer 106, the status of a mass storage device connected to the target computer 106, and the status of a speaker output of the target computer 106, respectively. In particular, when the remote power controller program 112 receives data from the remote power controller 116 indicating that the target computer 106 is powered on, the visual indicator 506A will be displayed. When the remote power controller program 112 receives data from the remote power controller 116 indicating that a mass storage device of the target computer 106 is active, the visual indicator 506B will be displayed. Similarly, when the remote power controller program 112 receives data from the remote power controller 116 indicating that a speaker output of the target computer 106 is active, the visual indicator 506C will be displayed. In this manner, a user of the host computer 104 or the remote computer 102 can view the power, mass storage, and speaker status of the target computer 106 even when they are remotely located from the target computer 106. Similarly, a user of the remote computer 102 or the host computer 104 can toggle the power of the target computer 106 or reset the target computer 106 from a remote location.

Figure 6:
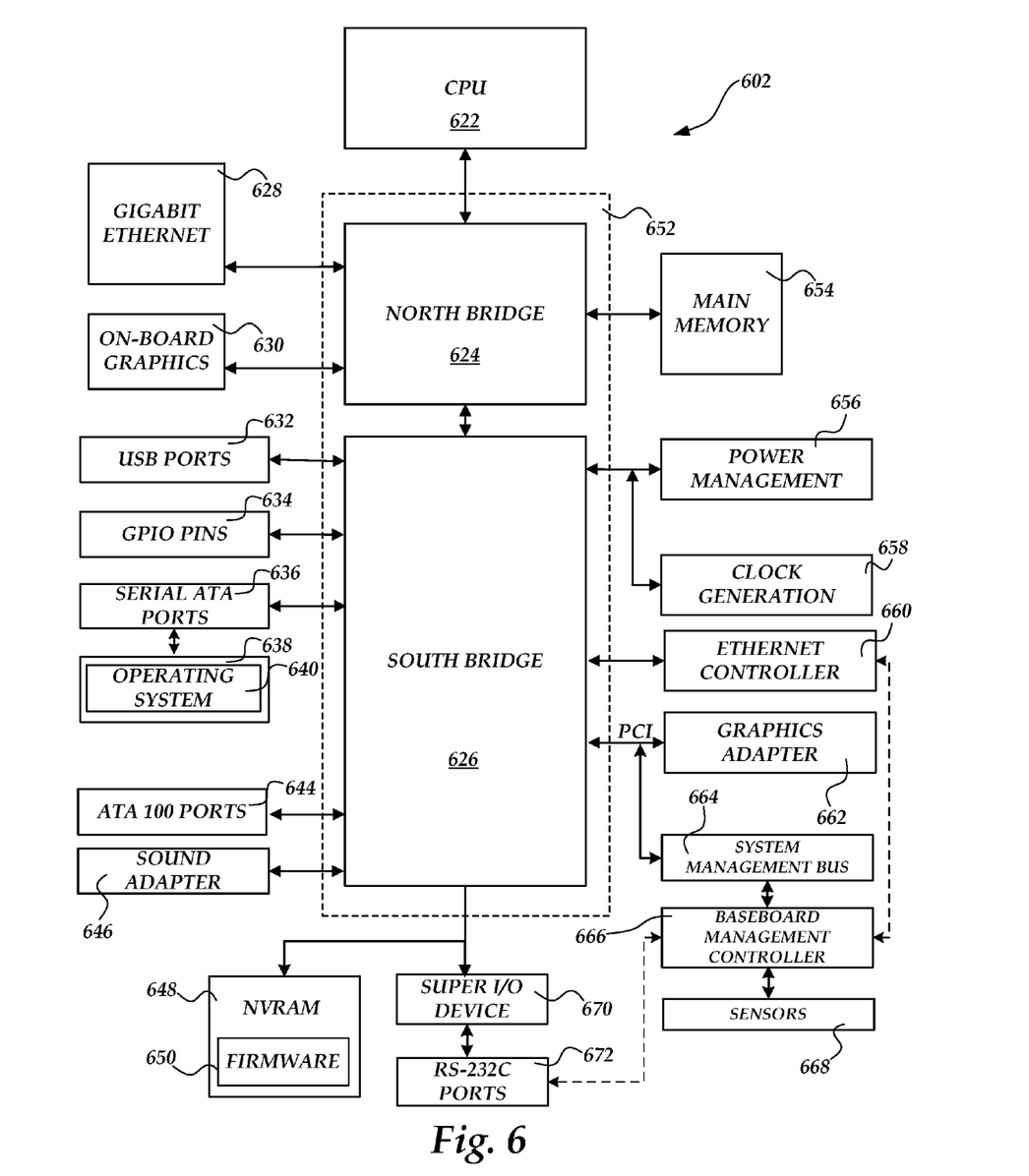
FIG. 6 is a computer architecture diagram showing an illustrative computer hardware architecture for a computing system capable of implementing aspects of the embodiments presented herein.

FIG. 6 and the following discussion are intended to provide a brief, general description of one suitable computing environment in which aspects of the embodiments described herein may be implemented. In particular, FIG. 6 shows a computer architecture for a computer 602 that may be utilized to embody the remote computer 102, the host computer 103, and/or the target computer 106, discussed above. It should be appreciated that the computer architecture shown in FIG. 6 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 602 shown in FIG. 6 includes a baseboard, or "motherboard", which is a printed circuit board to which a multitude of components or devices may be connected by way of a system bus or other electrical communication path. In one illustrative embodiment, a CPU 622 operates in conjunction with a chipset 652. The CPU 622 is a standard central processor that performs arithmetic and logical operations necessary for the operation of the computer. The server computer 602 may include a multitude of CPUs 622.

The chipset 652 includes a north bridge 624 and a south bridge 626. The north bridge 624 provides an interface between the CPU 622 and the remainder of the computer 602. The north bridge 624 also provides an interface to a random access memory ("RAM") used as the main memory 654 in the computer 602 and, possibly, to an on-board graphics adapter 630. The north bridge 624 may also include functionality for providing networking functionality through a gigabit Ethernet adapter 628. The gigabit Ethernet adapter 628 is capable of connecting the computer 602 to another computer via a network. Connections which may be made by the network adapter 628 may include LAN or WAN connections. LAN and WAN networking environments are commonplace in offices, enterprise-wide computer networks, intranets, and the internet. The north bridge 624 is connected to the south bridge 626.

The south bridge 626 is responsible for controlling many of the input/output functions of the computer 602. In particular, the south bridge 626 may provide one or more USB ports 632, a sound adapter 646, an Ethernet controller 660, and one or more GPIO pins 634. The south bridge 626 may also provide a bus for interfacing peripheral card devices such as a graphics adapter 662. In one embodiment, the bus comprises a PCI bus. The south bridge 626 may also provide a system management bus 664 for use in managing the various components of the computer 602. Additional details regarding the operation of the system management bus 664 and its connected components are provided below.

The south bridge 626 is also operative to provide one or more interfaces for connecting mass storage devices to the computer 602. For instance, according to an embodiment, the south bridge 626 includes a serial advanced technology attachment ("SATA") adapter for providing one or more SATA ports 636 and an ATA 100 adapter for providing one or more ATA 100 ports 644. The SATA ports 636 and the ATA 100 ports 644 may be, in turn, connected to one or more mass storage devices such as the SATA disk drive 638 storing an operating system 640 and application programs.

As known to those skilled in the art, an operating system 640 comprises a set of programs that control operations of a computer and allocation of resources. An application program is software that runs on top of the operating system software, or other runtime environment, and uses computer resources to perform application specific tasks desired by the user. According to one embodiment of the invention, the operating system 640 comprises the LINUX operating system. According to another embodiment of the invention the operating system 640 comprises an operating system within the WINDOWS family of operating systems from MICROSOFT CORPORATION. According to another embodiment, the operating system 640 comprises the UNIX or SOLARIS operating system. It should be appreciated that other operating systems may also be utilized.

The mass storage devices connected to the south bridge 626, and their associated computer storage media, provide non-volatile storage for the computer 602. Although the description of computer storage media contained herein refers to a mass storage device, such as a hard disk or CD-ROM drive, it should be appreciated by those skilled in the art that computer storage media can be any available media that can be accessed by the computer 602.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 626 for connecting a "Super I/O" device 670. The Super I/O device 670 is responsible for providing a number of input/output ports, including a keyboard port, a mouse port, a serial interface 672, a parallel port, and other types of input/output ports. The LPC interface may also connect a computer storage media such as a ROM or a flash memory such as a NVRAM 648 for storing the firmware 650 that includes program code containing the basic routines that help to start up the computer 602 and to transfer information between elements within the computer 602.

As described briefly above, the south bridge 626 may include a system management bus 664. The system management bus 664 may include a BMC 666. In general, the BMC 666 is a microcontroller that monitors operation of the computer system 602. In a more specific embodiment, the BMC 666 monitors health-related aspects associated with the computer system 602, such as, but not limited to, the temperature of one or more components of the computer system 602, speed of rotational components (e.g., spindle motor, CPU Fan, etc.) within the system, the voltage across or applied to one or more components within the system 602, and the available or used capacity of memory devices within the system 602. To accomplish these monitoring functions, the BMC 666 is communicatively connected to one or more components by way of the management bus 664. In an embodiment, these components include sensor devices 668 for measuring various operating and performance-related parameters within the computer system 602. The sensor devices 668 may be either hardware or software based components configured or programmed to measure or detect one or more of the various operating and performance-related parameters.

It should be appreciated that, as described above, the computer 602 may also include one or more motherboard header pins 118. As discussed above, connections may be made to the header pins 118 to toggle the power of and to reset the computer 602. Connections to the header pins 118 may also be made to obtain signals indicating the power status of the computer 602, the status of a mass storage device connected to the computer 602, the status of a speaker audio output device, and for obtaining other types of status information from the computer 602. As discussed above, the remote power controller 106 is configured for connection to the header pins 118 to enable monitoring and control in the manner described above.

It should also be appreciated that the computer 602 may comprise other types of computing devices, including hand-held computers, embedded computer systems, personal digital assistants, and other types of computing devices known to those skilled in the art. It is also contemplated that the computer 602 may not include all of the components shown in FIG. 6, may include other components that are not explicitly shown in FIG. 6, or may utilize an architecture completely different than that shown in FIG. 6.

Based on the foregoing, it should be appreciated that technologies for remotely controlling and monitoring the operation of a computer system are presented herein. Although aspects of the subject matter presented herein has been described in language specific to computer structural and hardware features, methodological acts, and computer storage media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. An apparatus for remotely controlling and monitoring the operation of a target computer having a motherboard, the apparatus comprising:
   a host computer having a controller program and a controller driver, wherein the controller program is configured to receive a power state change request either from a local user interface or from a remote user interface at a remote computer, to generate first data specifying a request for changing a power state of the target computer based on the power state change request, and to transmit the first data via the controller driver; and
   a remote power controller, comprising:
      a first local interface for communicating with the controller driver of the host computer over a first communications link;
      a second local interface for communicating directly with the motherboard of the target computer over a second communications link; and a processing component operatively coupled to the first local interface and the second local interface, programmed to receive the first data from the host computer over the first communications link and, in response to receiving the first data, to generate a signal for changing the power state of the target computer based on the first data and to transmit the signal for changing the power state of the target computer over the second communications link directly to at least one header pin of the motherboard of the target computer, wherein the remote power controller, the host computer, and the target computer are local to each other, independently operable, and physically set apart from each other.

2. The apparatus of claim 1, wherein the controller program of the host computer is further configured to receive a reset request either from the local user interface or remotely from the remote user interface, to generate second data specifying a request to reset the target computer based on the reset request, and to transmit the second data via the controller driver to the processing component by way of the first local interface; and wherein the processing component is further configured to receive the second data from the host computer by way of the first local interface and, in response to receiving the second data, to generate a signal for resetting the target computer based on the second data and to transmit the signal for resetting the target computer by way of the second local interface to the at least one header pin of the mother board of the target computer.

3. The apparatus of claim 1, wherein the processing component is further configured to receive a signal indicating the power state of the target computer by way of the second local interface from the at least one header pin of the motherboard of the target computer, to generate third data indicating the power state of the target computer based on the signal indicating the power state of the target computer, and to transmit the third data to the host computer by way of the first local interface; and wherein the controller program of the host computer is further configured to receive the third data via the controller driver, to generate visual indication information indicating the power state of the target computer based on the third data, and to display the visual indication information either through the local user interface or remotely through the remote user interface.

4. The apparatus of claim 1, wherein the processing component is further configured to receive a signal indicating a state of a mass storage device of the target computer by way of the second local interface from the at least one header pin of the motherboard of the target computer, to generate fourth data indicating the state of the mass storage device of the target computer based on the signal indicating the state of the mass storage device of the target computer, and to transmit the fourth data to the host computer by way of the first local interface; and wherein the controller program of the host computer is further configured to receive the fourth data via the controller driver, to generate visual indication information indicating the state of the mass storage device based on the fourth data, and to display the visual indication information either through the local user interface or remotely through the remote user interface.

5. The apparatus of claim 1, wherein the processing component is further configured to receive a signal indicating a state of an audio device of the target computer by way of the second local interface from the at least one header pin of the motherboard of the target computer, to generate fifth data indicating the state of the audio device of the target computer based on the signal indicating the state of the audio device of the target computer, and to transmit the fifth data to the host computer by way of the first local interface; and wherein the controller program of the host computer is further configured to receive the fifth data via the controller driver, to generate visual indication information indicating the state of the audio device of the target computer based on the fifth data, and to display the visual indication information either through the local user interface or remotely through the remote user interface.

6. The apparatus of claim 1, wherein the first local interface comprises a universal serial bus (USB)-to-universal asynchronous receiver/transmitter (UART) interface.

7. The apparatus of claim 1, wherein the processing component comprises a microcontroller and wherein the second local interface comprises one or more general purpose input/output (GPIO) connections provided by the microcontroller.

8. The apparatus of claim 1, wherein the signal for changing the power state of the target computer is transmitted directly from the processing component to the at least one header pin on the motherboard of the target computer, via only the second local interface.

9. The apparatus of claim 1, wherein the remote power controller is physically set apart from the host computer and the target computer between the first communications link and the second communications link.

10. The apparatus of claim 3, wherein the processing component is further programmed to receive the signal indicating the power state of the target computer directly from a power header pin on the motherboard of the target computer, over the second communications link.

11. The apparatus of claim 4, wherein the processing component is further programmed to receive the signal indicating the state of the mass storage device directly from a drive header pin on the motherboard of the target computer, over the second communications link.

12. The apparatus of claim 5, wherein the processing component is further programmed to receive the signal indicating the state of the audio device directly from a speaker header pin on the motherboard of the target computer, over the second communications link.

13. The apparatus of claim 6, wherein the first communications link is configured for USB communications from the host computer to the first local interface.

14. The apparatus of claim 7, wherein the second communications link is configured for SGPIO communications between the second local interface and the at least one header pin of the motherboard of the target computer.

15. An apparatus for remotely controlling and monitoring the operation of a target computer having a motherboard, the apparatus comprising:

a host computer having a controller program and a controller driver, wherein the controller program is configured to receive a power state change request either from a local user interface or from a remote user interface at a remote computer, to generate first data specifying a request for changing a power state of the target computer based on the power state change request, and to transmit the first data via the controller driver;

a remote computer having the remote user interface and operatively coupled to the host computer via a network; and a remote power controller, comprising:
- a first local communications interface configured for communicating with the controller driver of the host computer over a first communications link;
- a second local communications interface configured for directly communicating with the target computer over a second communications link; and
- a microcontroller operatively coupled to the first local communications interface and the second local communications interface, the microcontroller having one or more general purpose input/output (GPIO) connections configured for connecting over the second communications link directly to at least one header pin of the motherboard of the target computer and a memory having program code stored therein which, when executed by the microcontroller, will cause the microcontroller to receive the first data from the host computer over the first communications link and, in response to receiving the request, to generate a signal for changing the power state of the target computer based on the first data and to transmit the signal for changing the power state of the target computer on one of the GPIO connections over the second communications link and directly to the at least one header pin of the motherboard of the target computer, wherein the remote power controller, the host computer, and the target computer are local to each other, independently operable, and physically set apart from each other.

16. The apparatus of claim 15, wherein the controller program of the host computer is further configured to receive a reset request either from the local user interface or remotely from the remote user interface, to generate second data specifying a request to reset the target computer based on the reset request, and to transmit the second data via the controller driver to the processing component by way of the first local communications interface; and wherein the memory has further program code stored therein which, when executed by the microcontroller, will cause the microcontroller to receive the second data from the host computer by way of the first local communications interface and, in response to receiving the second data, to generate a signal for resetting the target computer based on the second data and to transmit the signal for resetting the target computer on one of the GPIO connections by way of the second local communications interface to the at least one header pin of the motherboard of the target computer.

17. The apparatus of claim 16, wherein the memory has further program code stored therein which, when executed by the microcontroller, will cause the microcontroller to receive a signal indicating the power state of the target computer on one of the GPIO connections by way of the second local communications interface from the at least one header pin of the motherboard of the target computer, to generate third data indicating the power state of the target computer based on the signal indicating the power state of the target computer, and to transmit the third data to the host computer by way of the first local communications interface; and wherein the controller program of the host computer is further configured to receive the third data via the controller driver, to generate visual indication information indicating the power state of the target computer based on the third data, and to display the visual indication information either through the local user interface or remotely through the remote user interface.

18. The apparatus of claim 17, wherein the memory has further program code stored therein which, when executed by the microcontroller, will cause the microcontroller to receive a signal indicating a state of a mass storage device of the target computer on one of the GPIO connections by way of the second local communications interface from the at least one header pin of the motherboard of the target computer, to generate fourth data indicating the state of the mass storage device of the target computer based on the signal indicating the state of the mass storage device of the target computer, and to transmit the fourth data to the host computer by way of the first local communications interface; and wherein the controller program of the host computer is further configured to receive the fourth data via the controller driver, to generate visual indication information indicating the state of the mass storage device based on the fourth data, and to display the visual indication information either through the local user interface or remotely through the remote user interface.

19. The apparatus of claim 18, wherein the memory has further program code stored therein which, when executed by the microcontroller, will cause the microcontroller to receive a signal indicating a state of an audio device of the target computer on one of the GPIO connections from the at least one header pin of the motherboard of the target computer, to generate fifth data indicating the state of the audio device of the target computer based on the signal indicating the state of the audio device of the target computer, and to transmit the fifth data to the host computer by way of the first local communications interface; and wherein the controller program of the host computer is further configured to receive the fifth data via the controller driver, to generate visual indication information indicating the state of the audio device of the target computer based on the fifth data, and to display the visual indication information either through the local user interface or remotely through the remote user interface.

20. The apparatus of claim 19, wherein the first local communications interface comprises a universal serial bus (USB)-to-universal asynchronous receiver/transmitter (UART) interface.

21. The apparatus of claim 15, wherein the signal for changing the power state of the target computer is transmitted directly from microcontroller to the at least one header pin on the motherboard of the target computer, via only one of the GPIO connections.

22. The apparatus of claim 15, wherein the remote power controller is physically set apart from the host computer and the target computer between the first communications link and the second communications link.

23. A system for remotely controlling and monitoring the operation of a target computer having a motherboard, the system comprising:
- a host computer having a controller program executing thereon and a controller driver, wherein the controller program is configured to receive a power toggle request either from a local user interface or from a remote user interface at a remote computer, to generate first data specifying a request for toggling power to the target computer based on the power toggle request, and to transmit the first data via the controller driver;
- a remote computer having the remote user interface and operatively coupled to the host computer via a network; and
- a remote power controller having a first local interface communicatively connected to the controller driver of the host computer over a first communications link, and a second local communications interface directly connected to the target computer over a second communications link, the remote power controller configured to receive the first from the controller program executing on the host computer via the controller driver, by way of the first local interface and over the first communications link, and, in response to receiving the first data, to generate a signal for toggling power to the target computer based on the first data and to transmit the signal for toggling power to the target computer, by way of the second local interface, over the second communications link and directly to at least one header pin of the motherboard of the target computer, wherein the remote power controller, the host computer, and the target computer are local to each other, independently operable, and physically set apart from each other.

24. The system of claim 23, wherein the local user interface or the remote user interface is configured to generate the power toggle request based on an input from a user, and the controller program is configured to, in response to receiving the power toggle request, generate the first data based on the power toggle request and transmit the first data to the remote power controller via the controller driver by way of the first local interface.

25. The system of claim 24, wherein the remote power controller is further configured to receive second data specifying a request to reset the target computer from the host computer by way of the first local interface and, in response to receiving the second data, to generate a signal for resetting the target computer based on the second data and to transmit the signal for resetting the target computer by way of the second local interface to the at least one header pin of the mother board of the target computer.

26. The system of claim 25, wherein the controller program of the host computer is further configured to receive a reset request either from the local user interface or remotely from the remote user interface, and in response to receiving the reset request, to generate the second data specifying a request to reset the target computer based on the reset request and to transmit the second data to the remote power controller via the controller driver by way of the first local interface.

27. The system of claim 26, wherein the remote power controller is further configured to receive a signal indicating a power state of the target computer by way of the second local interface from the at least one header pin of the motherboard of the target computer, to generate third data indicating the power state of the target computer based on the signal indicating the power state of the target computer, and to transmit the third data to the host computer by way of the first local interface.

28. The system of claim 27, wherein the controller program is further configured to receive the third data via the controller driver, to generate visual indication information indicating the power state of the target computer based on the third data, and to display the visual indication information either through the local user interface or remotely through the remote user interface.

29. The system of claim 28, wherein the first local interface comprises a universal serial bus (USB)-to-universal asynchronous receiver/transmitter (UART) interface and wherein the second local interface comprises one or more general purpose input/output (GPIO) connections provided by a microcontroller.

30. The system of claim 23, wherein the signal for toggling power to the target computer is transmitted directly from the remote power controller to the at least one header pin on the motherboard of the target computer, via only the second local interface.

31. The apparatus of claim 23, wherein the remote power controller is physically set apart from the host computer and the target computer between the first communications link and the second communications link.

* * * * *